Sept. 4, 1934.  L. D. SOUBIER  1,972,464
MACHINE FOR BLOWING GLASS ARTICLES IN MOLDS
Filed Dec. 10, 1930  5 Sheets-Sheet 3

Inventor
Leonard D. Soubier
By J. F. Rule, Attorney

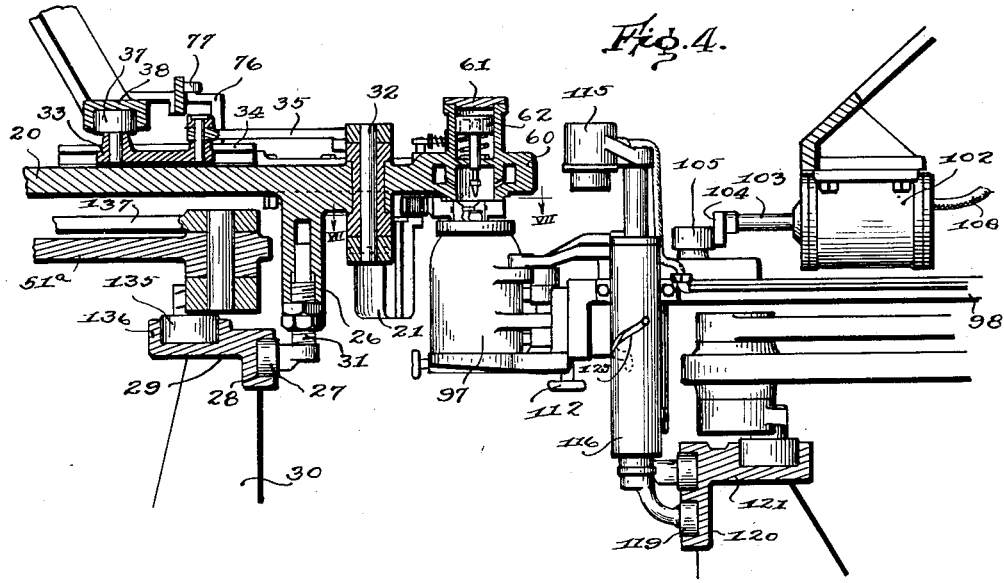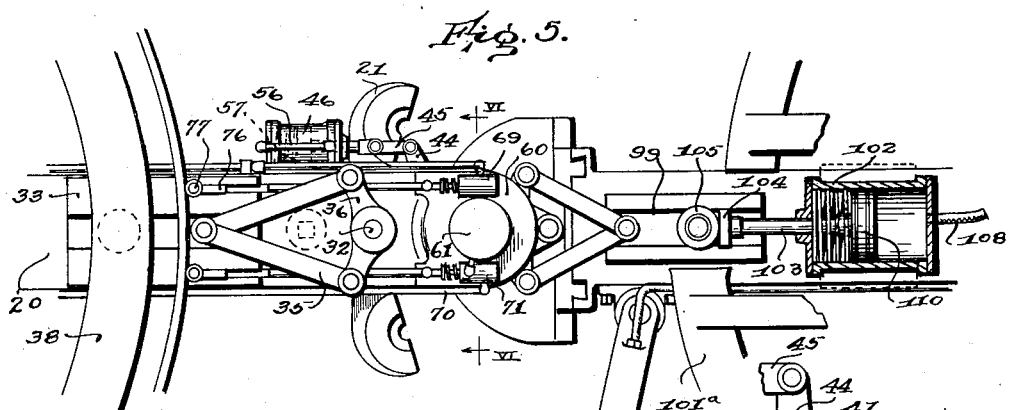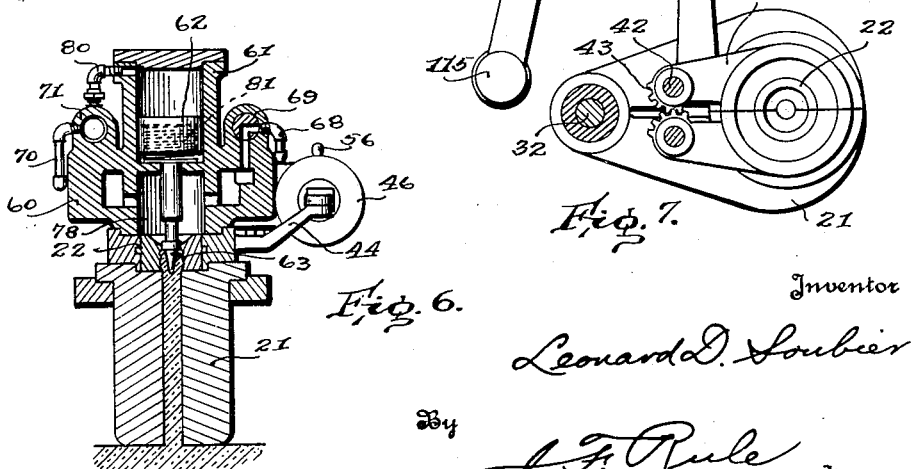

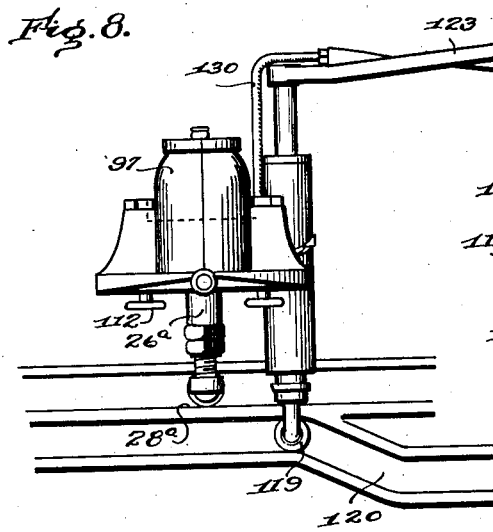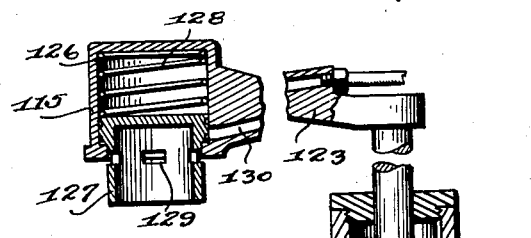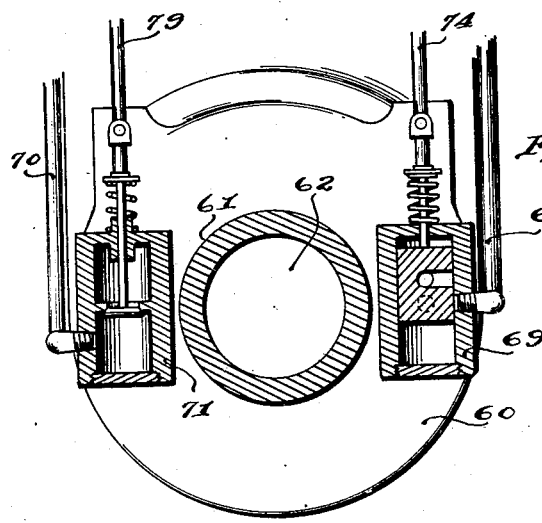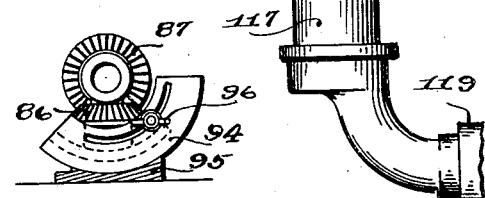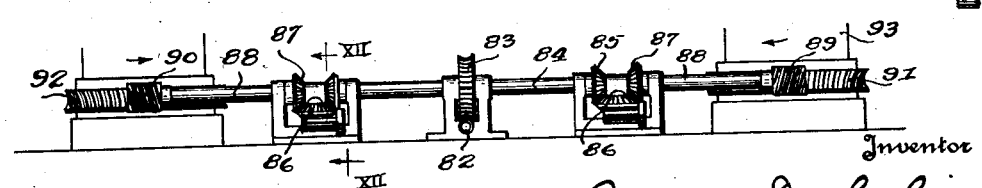

Patented Sept. 4, 1934

1,972,464

UNITED STATES PATENT OFFICE 1,972,464

MACHINE FOR BLOWING GLASS ARTICLES IN MOLDS

Leonard D. Soubier, Alton, Ill., assignor to Owens-Illinois Glass Company, a corporation of Ohio Application December 10, 1930, Serial No. 501,244

6 Claims. (Cl. 49—5)

My invention relates to machines for making hollow glassware such as bottles, jars and the like which are blown in molds, and has particular reference to machines of the type in which a blank mold carriage and a finishing mold carriage are mounted side by side for rotation about vertical axes, and including mechanism for transferring the parisons from the blank molds to the finishing molds.

My invention provides a machine of this type in which the blank molds gather their charges of glass by suction while rotating with the blank mold carriage, together with parison transfer mechanism which permits the rotation of a blank mold and a finishing mold to be discontinued at a transfer station during the transfer of a parison. An object of such an arrangement is to obtain the advantages of an accurate parison transfer free from the mechanical difficulties and complications of mechanism for transferring the parisons while the molds are traveling. At the same time, provision is made for causing the blank mold to travel while it is gathering its charge by suction, thereby permitting the glass to be gathered from a stationary container and avoiding the objections incident to gathering by suction while the mold is stationary.

Other objects of the invention will appear hereinafter.

In the accompanying drawings:

Fig. 4 is a fragmentary sectional elevation showing a blank mold, finishing mold and adjacent parts in the position assumed about the time the transfer of the parison has been completed, the blank and neck molds being open and the finishing mold closed about the parison.

Fig. 5 is a plan view of the same.

Fig. 6 is a sectional elevation through the parison mold and the suction head, the view being taken at the line VI—VI on Fig. 5, but with the blank mold closed.

Fig. 7 is a sectional plan view showing the neck mold and blank mold, the view being taken at the line VII—VII on Fig. 4, but with the blank and neck molds closed.

Fig. 8 is a fragmentary elevation view showing a finishing mold and its blowing head.

Fig. 9 is a detail part sectional elevation of the blowing head and its operating mechanism.

Fig. 10 is a sectional plan view showing the suction head and the valves mounted thereon.

Fig. 11 is an elevation view of the driving mechanism for the mold carriages.

Fig. 12 is a view taken substantially at the line XII—XII on Fig. 11, showing means for rotatively adjusting one mold carriage relative to the other.

Figure 1:
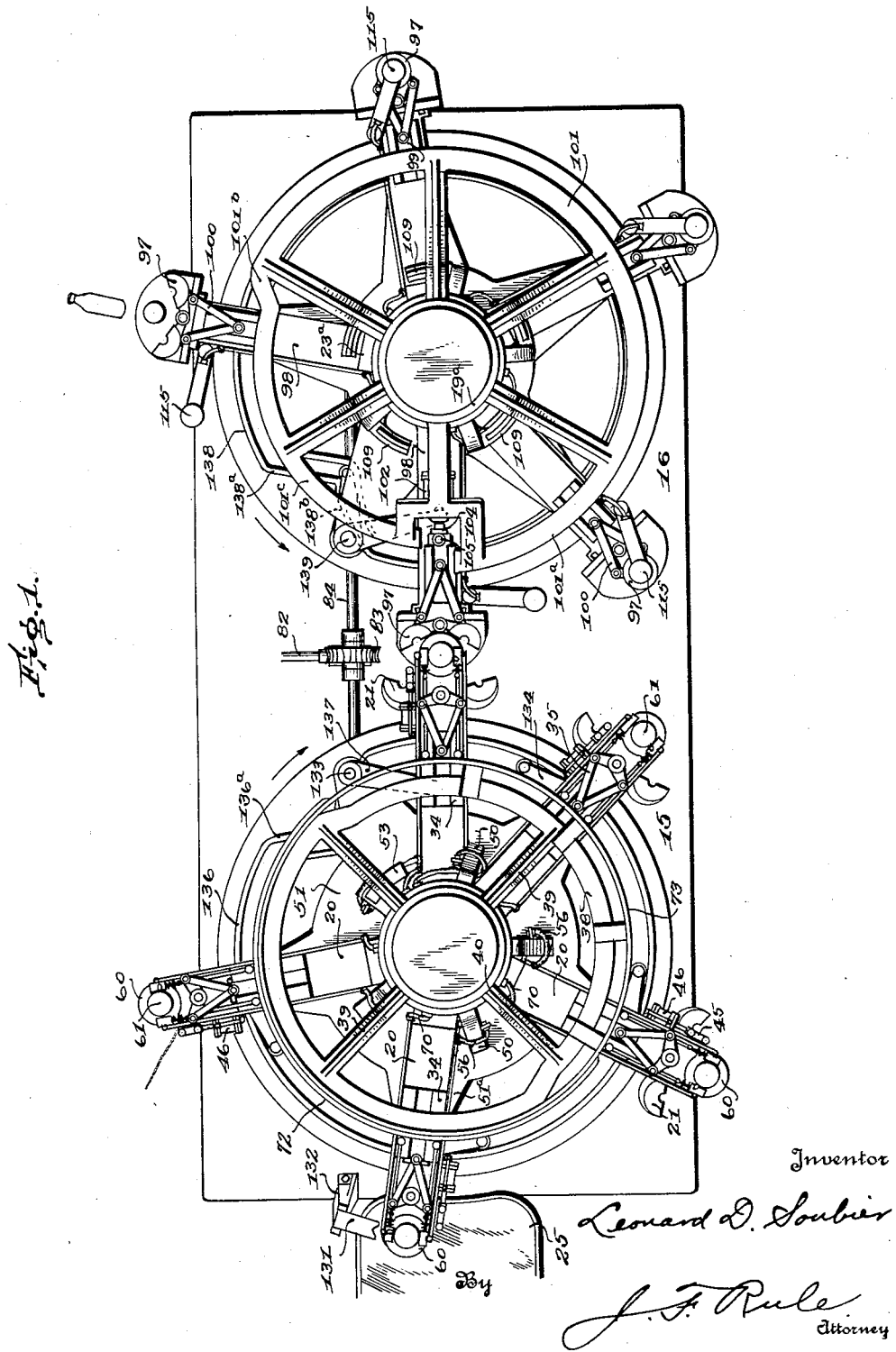
Fig. 1 is a plan view of a machine embodying the principles of my invention.

Referring to the accompanying drawings, the machine comprises a blank mold table or carriage 15 and a finishing mold table or carriage 16, both mounted for continuous horizontal rotation on a wheeled base or platform 17. The blank mold carriage comprises a tubular shaft 18 mounted to rotate about a stationary hollow column 19 fixed to the base 17. In the particular construction herein shown, there are provided five sections or units substantially alike in construction and each comprising a horizontally disposed arm 20 extending radially of the mold carriage and supporting a mold group including a blank mold 21 and a neck mold 22 which together form a parison mold. The arms 20 are connected by horizontal pivots 23 to rings 24 individual to said arms, said rings being mounted one above another on the column 19. The mold carrying arms 20 are all arranged in the same plane. The pivotal connections 23 permit the arms 20 to tilt for lifting the blank molds 21 over the rim of a receptacle 25 which contains a supply of molten glass. The container 25 may be the usual forehearth extension of a glass melting tank.

Each arm 20 (see Figs. 2 and 4) is provided adjacent its outer end with a vertically depending post 26 which carries a cam roll 27 running on a stationary cam track 28 formed in the vertical face of a cam ring 29 supported on standards 30 rising from the base 17. The cam track 28 is preferably horizontal for the greater portion of its length, but is so shaped that it will lift the blank mold 21 over the rim of the container 25 as the mold approaches the gathering area and again when the mold leaves the gathering area. The cam roll 27 is carried by a screw threaded stem 31 adjustable up and down in the post 26 for up and down adjustment of the arm 20 and parts carried thereby.

Each blank mold 21 comprises horizontally separable sections mounted to swing about the axis of a vertical pivot pin 32 mounted in the arm 20. Means for opening and closing the blank mold includes a slide block 33 which reciprocates in guides 34 on the arm 20 and has an operating connection through links 35 with rock arms 36 connected to the blank mold sections. A cam roll 37 on the slide block 33 runs in a cam track formed on the under surface of a stationary cam ring 38. The cam ring is carried on bracket arms 39 formed integral with a collar 40 bolted to the upper end of the column 19.

Each neck ring 22 (see Figs. 6 and 7) comprises separable sections carried on arms 41 mounted on pivot pins 42 depending from the arm 20, the arms 41 being formed with intermeshing gears 43. One of said arms 41 has an extension 44 connected through a link 45 to the piston of an air motor 46 for opening and closing the neck mold. Air under pressure for operating the motor 46 is supplied from a constant source of air pressure through a pipe 47 (Fig. 2) which extends upward through the column 19 and opens into an annular channel in said column, which registers with a channel 48 formed in a collar 49 which surrounds the column 19. The collar 49 is carried by arms 50 rising from a plate or spider 51 mounted on the shaft 18 and forming part of the rotating mold carriage. There is preferably provided an arm 50 for each mold group. On each arm 50 is a valve 52 which controls the supply of air to the motor 46. The valves 52 are operated in succession by a stationary cam plate 53 positioned and arranged to depress the valve stem 54 of each valve 52 when the corresponding neck mold is at the parison transfer position, thereby establishing an air line from the collar 49 through a pipe 55 to the valve 52 and thence through a pipe 56 to the outer end of the air motor 46. The neck mold may be closed by a spring 57 (Fig. 5) when the air pressure is cut off.

Each of the mold carrying arms 20 is provided with a suction head 60 formed with a vacuum chamber 78 which opens into the parison mold. Above the head 60 and, as shown, formed integral therewith, is a piston motor 61 including a piston 62 carrying the usual plunger 63 for forming an initial blow opening in the parison.

A vacuum line leading to the head 60 comprises a vacuum pipe 64 (Fig. 2) which extends upward within the column 19 to a port 65 having communication through a vertical channel 66 in said column, with annular channels 67 formed in the collars 24. The vacuum line is extended from each channel 67 through a pipe 68 which leads to a valve 69 (see Fig. 10) on the head 60. Air pressure lines extend from the collar 49 through pipes 70 to valves 71 on the head 60.

Figure 3:
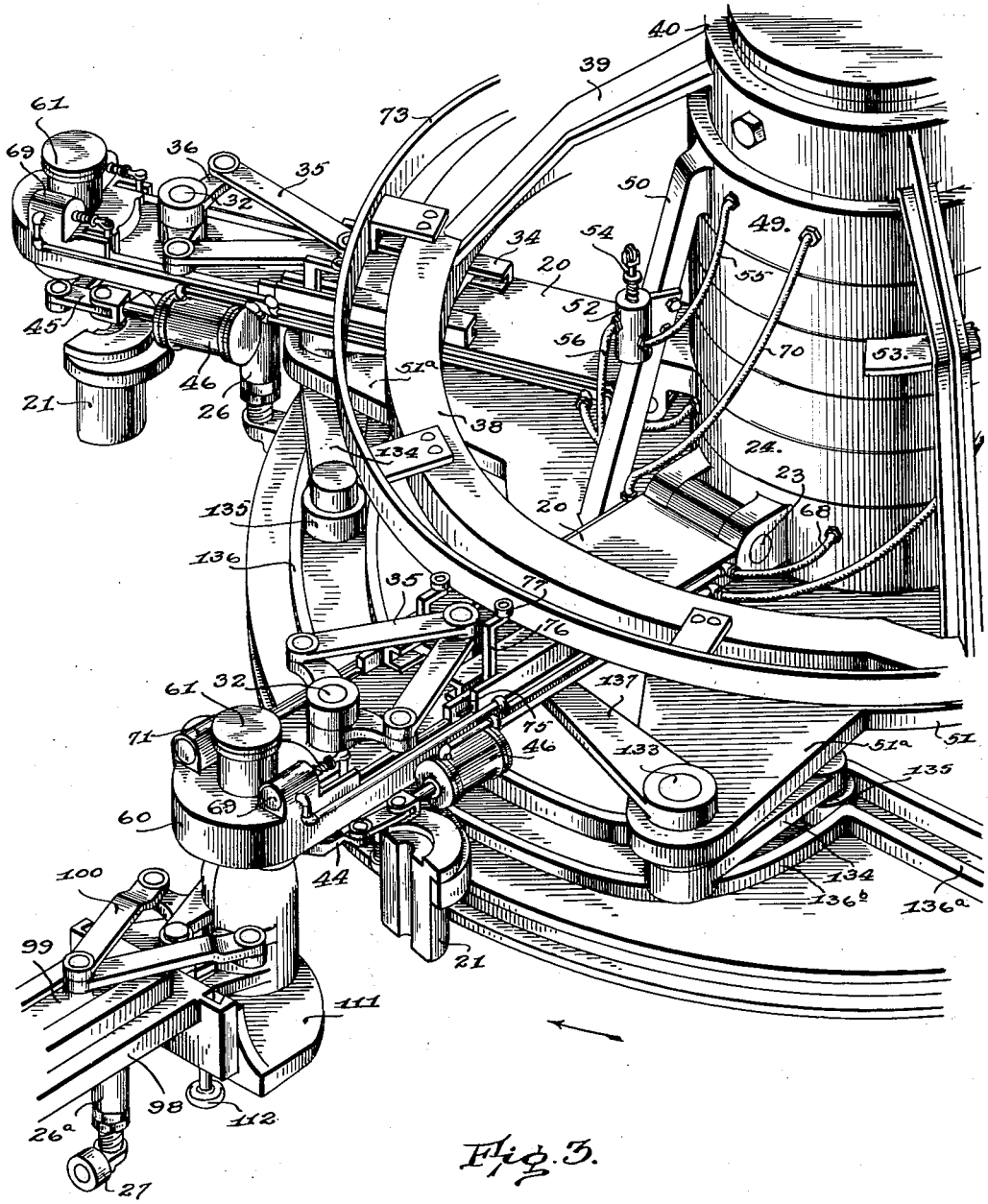
Fig. 3 is a fragmentary perspective view of the blank mold carriage and associated parts, and also showing a finishing mold at the transfer station.

The valves 69 and 71 are controlled by a cam 72 (see Fig. 1) which extends along the outer face of a ring 73 attached to the cam ring 38. The stem of the vacuum control valve 69 is connected through a rod 74 (Fig. 10) to a slide 75 (Fig. 3) which carries an upright arm 76 on which is a roll 77 which runs on the cam 72 and ring 73. When the cam engages the roll 77 it actuates the valve and thereby opens the pipe 68 to the vacuum chamber 78 (Fig. 6) in the head 60. The air pressure valve 71 is actuated in like manner by the cam 72 which operates through a rod 79 connected to the valve stem. When the valve 71 is opened, air under pressure is supplied through the pipe 70, valve 71 and a pipe 80 (Fig. 6) to the upper end of the cylinder 61, thereby lowering the piston 62 and plunger 63. When the valve 71 is again closed, the plunger 63 is retracted by means of a spring 81 beneath the piston 62.

The mold carriages are rotated continuously in opposite directions by driving mechanism including a drive shaft 82 (Figs. 1, 2 and 11) carrying a worm running in mesh with a worm gear 83 on a shaft 84. Gears 85 on the ends of the shaft 84 mesh with pinions 86 which in turn mesh with gears 87 on shafts 88 which carry worms 89 and 90 running in mesh, respectively, with worm gears 91 and 92. The gear 92 is mounted on the shaft 18 which drives the blank mold carriage. The gear 91 is mounted on a shaft 93 which drives the finishing mold carriage.

Adjusting mechanism (Fig. 12) is provided for rotatively adjusting one of the shafts 88 relative to the shaft 84 and thereby rotatively adjusting one mold carriage relative to the other. For this purpose, the pinion 86 is carried on a support 94 which is mounted on a stationary bearing block 95 for adjustment in an arc concentric with the gear 87. A clamping screw 96 clamps the parts in adjusted position. This adjustment permits the parison mold and finishing mold to be accurately aligned for the transfer operation.

The finishing molds 97 are mounted on radially disposed arms 98 on the finishing mold carriage, the number of finishing molds being preferably equal to the number of blank molds. The molds 97 are made in separable sections for opening and closing, each mold being actuated by a slide block 99 having link connections 100 with the mold arms. The slide block is under the control of a stationary cam 101, except while the finishing mold is at the transfer station. The cam 101 comprises a dwell portion 101a by which the finishing mold is held closed during the greater part of its rotation with the mold carriage, an operating section 101b by which the mold is opened to discharge the finished article, and a dwell portion 101c by which the mold is held open until it reaches the transfer station. This station is midway between the axes of the mold carriages and in a line joining said axes.

The finishing mold which, as more fully set forth hereinafter, is held against rotation with the mold carriage during the parison transfer operation,—is closed by means of an air motor 102 (Figs. 1, 2, 4 and 5) comprising a piston 103 having a head 104 which, when the arm 98 carrying the finishing mold is brought to rest at the transfer station, is positioned behind the cam roll 105 on the slide block 99. The motor 102 is mounted on a stationary support 106 on which is also mounted a valve 107 in an air line 108 extending from the air pressure pipe 47 to the motor. The valve 107 is opened by a cam 109 (Fig. 1) which rotates with the mold carriage, thereby supplying air pressure behind the piston 110 (Fig. 5) which operates the slide block 99 to close the finishing mold. This brings the roll 105 in line with the cam section 101a so that when the mold again commences its travel it is under the control of the cam 101.

The arms 98 which carry the finishing molds are mounted independently of each other for rotation about a stationary central column 19a in substantially the same manner as the blank mold carrying arms 20 are mounted on the column 19. That is, the arms 98 have hinge connections 23a (Fig. 1) with collars individual to said arms and rotatable on the column 19a. Posts 26a (Figs. 2 and 3) depending from the arms 98 adjacent their outer ends, carry cam rolls 27' which run in a stationary track 28a for supporting the arms 98. The posts 26a are adjustable in length to accurately adjust the height of the finishing molds, the construction being the same as above described in connection with the posts 26. The sections of each finishing mold are supported on a bottom plate 111 (see Fig. 3) which is adjustable up and down on the arm 98 to accommodate molds of different heights. Such adjustment may be effected by adjusting screws 112.

Blowing heads 115 (see Figs. 4, 8 and 9) individual to the finishing molds, are provided for blowing the parisons to their finished form. Each blowing head mechanism comprises a tubular casing 116 having a fixed mounting on the corresponding arm 98. A hollow shaft or sleeve 117 is mounted for up and down movement in the casing 116 and has a splined connection 118 with the casing to prevent rotation of the sleeve. A cam roll 119 attached to the lower end of said sleeve runs on a cam track 120 formed in a stationary cam ring or plate 121 for controlling the up and down movements of the sleeve. A rock shaft 122 rotatable in the sleeve 117 carries at its upper end a rock arm 123, on the outer end of which the blowing head is supported. A cam roll 124 attached to the rock shaft 122, extends through a horizontally disposed slot in the sleeve 117 and a cam slot 125 in the casing 116. When the sleeve 117 is moved up and down, the rock shaft is carried up and down therewith and also given a rocking movement determined by the shape of the cam 125. This cam is so shaped that as the sleeve 117 is moved downward by its cam 120, the arm 123 is first rocked to bring the blowing head over the mold and then moved vertically downward to seat said head on the mold.

The blowing head comprises a casing 126 in which a cylindrical piston or head 127 is mounted for up and down movement, said head being projected by a coil spring 128 within the casing. When the head 127 is seated on the mold, it is forced into the casing 126, thereby bringing ports 129 into register with an air pressure line 130 so that air under pressure is supplied through the head 127 for blowing the parison. The air pressure line 130 may be connected to the pressure pipe 47 so that air pressure is continuously supplied to the finishing mold while the blowing head remains seated thereon. When the blowing head commences to lift from the mold, the spring 128 forces the member 127 outward and cuts off the air line 130.

A stationary knife 131 (Figs. 1 and 2) may be provided for severing the glass in the usual manner. The knife is mounted on a post 132 and projects over the rim of the pot or container 25 in position to shear across the bottom of the blank mold after the latter has received its charge and is lifted from the supply body of glass.

In order to permit each blank mold carrying arm 20 and the corresponding finishing mold carrying arm 98 to remain at rest at the transfer station during the transfer of a parison, means are provided for accelerating said arms and causing them to advance relative to the mold carriages as they approach the transfer position, and when they reach such position to remain at rest until the mold carriages again overtake them. The mechanism for controlling the movements of the arms 20 relative to the mold carriage will be understood by reference to Figs. 1, 2 and 3. As here shown, the plate or spider 51 which forms part of the rotating mold carriage, is formed with radially extending arms 51ª, there being one such arm for each mold carrying arm 20. Journaled in the outer end of each arm 51ª is a rock shaft 133, to which is secured a rock arm 134 carrying a cam roll 135 which runs in a continuous cam track 136 formed in the stationary cam ring 29. A rock arm 137 secured to the shaft 133 has a sliding connection at its outer end with the arm 20 so that when the shaft 133 is rocked, the arm 20 is rotated horizontally relative to the mold carriage. The cam 136 for the greater portion of its length is concentric with the mold carriage so that the mold carrying arm rotates with and at the same speed as the mold carriage during the greater portion of its travel.

As an arm 20 approaches the transfer station, the roll 135 runs into an operating section 136ª of the cam and thereby rocks the shaft 133 in a direction to advance the corresponding arm 20 and the mold thereon, relative to the mold carriage. This accelerated movement of the mold brings it to the transfer station directly between and in line with the axes of the mold carriages. When the mold reaches this transfer position, the cam roll 135 enters a section 136ᵇ of the cam 136 which is so shaped that it reverses the movement of the rock shaft 133 so that the arm 20 is swung relative to the mold carriage in a backward direction. The cam section 136ᵇ is so shaped that this backward movement of the arm 20 is at the same angular speed as the forward travel of the mold carriage, whereby the arm 20 is held stationary at the transfer station.

The finishing molds 97 as they approach the transfer station are accelerated and then held at rest at said station in the same manner as just described in connection with the blank molds and by substantially similar mechanism. This includes a stationary cam track 138 (Fig. 1) having operating sections 138ª and 138ᵇ for actuating rock arms on a rock shaft 139, which rock arms provide an operating connection between the cam and the mold carrying arm 98.

The operation will be understood from the foregoing description, but may be summarized as follows:

The mold carriages are rotated continuously and at the same angular speed in opposite directions. Each blank mold 21 as it approaches the gathering area is lifted over the rim of the container 25 under the control of the cam 28 and dipped into the glass, the blank mold and cooperating neck mold at this time being closed and in register. The cam 72 (Fig. 1) now actuates the vacuum valve 69 and the air pressure valve 71 (Figs. 6 and 10). The valve 71 admits air pressure above the piston 62 and lowers the plunger 63. At the same time the valve 69 being opened, permits the air to be exhausted from the parison mold to draw a charge of glass therein. The mold is then lifted and the glass severed by the knife 131.

Figure 2:
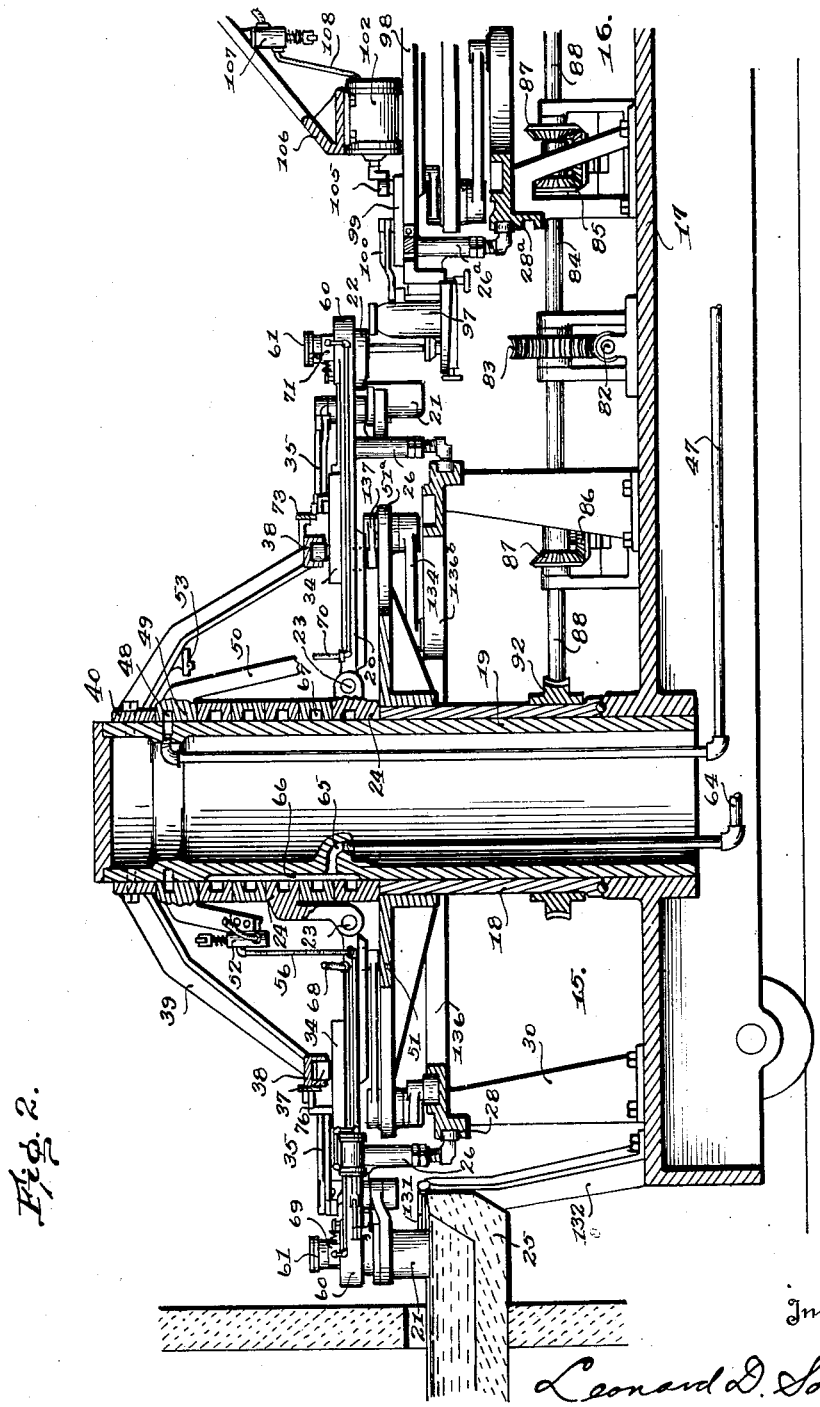
Fig. 2 is a sectional elevation showing the blank mold carriage and a portion of the finishing mold carriage.

As the parison mold with its charge and the corresponding finishing mold approach the transfer position, they are accelerated by the cams 136 and 138, respectively, as heretofore described, so as to move forward at a higher speed than the mold carriages till they reach the transfer station where they are brought to rest, the finishing mold being open at this time. The blank mold before it reaches the transfer station is opened by its cam 38, leaving the bare blank or parison suspended from the neck mold. When the neck mold with its suspended parison is brought to rest, the air motor 102 operates to close the finishing mold around the parison, the motor 102 being under the control of the valve 107 (Fig. 2). The air motor 46 now operates to open the neck mold, thereby completing the transfer, the operation of the motor 46 being controlled by the valve 52 actuated by the cam 53. After the transfer has been completed, the molds resume their rotation with the mold carriages. The blowing head 115 is now actuated by its cam 120 and thereby seated on the finishing mold and opened to air pressure for blowing the parison to finished form. Shortly before the discharge position is reached, the blowing head is lifted, allowing the finishing mold to be opened and discharge the finished article.

Modifications may be resorted to within the spirit and scope of my invention.

What I claim is:

1. In a machine for forming glass articles, the combination of a mold carriage rotatable about a vertical axis, a series of arms extending radially of the mold carriage, molds carried by said arms, means for individually rotating said arms relative to the mold carriage about said axis and at a higher angular speed than that of the mold carriage and thereby advancing the molds relative to the mold carriage in arcs concentric with said axis, and means individual to said arms for individually swinging them about horizontal axes.

2. In a machine for forming glass articles, the combination of a center column, a series of collars mounted for rotation on said column, arms individual to said collars and extending radially outward therefrom, said arms being pivotally connected to the collars for up and down swinging movement, molds carried by said arms, and means for individually rotating said collars about said column.

3. In a machine for forming glass articles, the combination of a center column, a series of collars mounted for rotation on said column, arms individual to said collars and extending radially outward therefrom, said arms being pivotally connected to the collars for up and down swinging movement, molds carried by said arms, a driving element, means for rotating said element continuously about the axis of said column, mechanisms individual to said arms forming driving connections between the driving element and the arms, and means for periodically actuating said mechanisms in succession and thereby causing relative rotation between the driving element and said arms.

4. In a machine for forming glass articles, the combination of a center column, a series of collars mounted for rotation on said column, arms individual to said collars and extending radially outward therefrom, said arms being pivotally connected to the collars for up and down swinging movement, molds carried by said arms, a driving element, means for rotating said element continuously about the axis of said column, connecting devices mounted on said driving element and forming driving connections between said element and said arms, and a stationary cam arranged to operate said connecting devices in succession and thereby impart to said arms in succession a rotative movement about said column relative to said driving element.

5. In a machine for forming glass articles, the combination of a vertical center column, a series of superposed collars rotatively mounted on said column, arms individual to said collars pivotally connected therewith and extending radially therefrom, said arms disposed in substantially the same horizontal plane, molds carried at the outer ends of said arms, a driving element mounted for rotation about the axis of said column, rock shafts mounted on said driving element, rock arms carried by said rock shafts and having driving connections with said arms, a stationary cam, and operating connections between said cam and the rock shafts.

6. In a machine for forming glass articles, the combination of a mold carriage rotatable about a vertical axis, an arm extending radially of the mold carriage and pivoted at its inner end, means for swinging the arm up and down about said pivot, a mold supported on the outer end of said arm, connections between said arm and the mold carriage permitting rotative movement of the arm about said vertical axis relative to the mold carriage, and means operating through said connections for causing said rotative movement of the arm.

LEONARD D. SOUBIER.